United States Patent
Yasuda et al.

(10) Patent No.: US 11,265,468 B2
(45) Date of Patent: Mar. 1, 2022

(54) IMAGE STABILIZATION APPARATUS, METHOD OF CONTROLLING THE SAME, IMAGE CAPTURING APPARATUS, AND STORAGE MEDIUM

(71) Applicant: CANON KABUSHIKI KAISHA, Tokyo (JP)

(72) Inventors: Ryuichiro Yasuda, Tokyo (JP); Fumihiro Kajimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/204,488

(22) Filed: Mar. 17, 2021

(65) Prior Publication Data

US 2021/0297593 A1 Sep. 23, 2021

(30) Foreign Application Priority Data

Mar. 23, 2020 (JP) .............................. JP2020-051775

(51) Int. Cl.
H04N 5/232 (2006.01)

(52) U.S. Cl.
CPC ..... *H04N 5/23254* (2013.01); *H04N 5/23258* (2013.01); *H04N 5/23287* (2013.01)

(58) Field of Classification Search
None
See application file for complete search history.

(56) References Cited

U.S. PATENT DOCUMENTS

| | | | | |
|---|---|---|---|---|
| 8,896,716 B2* | 11/2014 | Miyasako | .......... | H04N 5/23248 348/208.99 |
| 9,906,726 B2* | 2/2018 | Kajimura | ........... | H04N 5/23287 |
| 10,326,938 B2* | 6/2019 | Kajimura | ............... | G06K 9/481 |
| 10,638,044 B2* | 4/2020 | Takeuchi | ............ | H04N 5/23251 |
| 10,791,270 B2* | 9/2020 | Miyahara | .......... | H04N 5/23261 |
| 2016/0316146 A1* | 10/2016 | Kajimura | ........... | H04N 5/23254 |
| 2017/0013198 A1* | 1/2017 | Wada | ....................... | G06T 5/20 |
| 2018/0255245 A1* | 9/2018 | Miyazawa | ......... | H04N 5/23254 |
| 2019/0222760 A1* | 7/2019 | Takeuchi | ............. | H04N 5/2328 |
| 2021/0006721 A1* | 1/2021 | Yasuda | ............. | H04N 5/23254 |

FOREIGN PATENT DOCUMENTS

JP 2005-043780 A 2/2005

* cited by examiner

*Primary Examiner* — Cynthia Segura
(74) *Attorney, Agent, or Firm* — Cowan, Liebowitz & Latman, P.C.

(57) ABSTRACT

An image stabilization apparatus includes a first acquisition unit configured to acquire an output of a shake detection device, a motion vector detection unit configured to detect a motion vector, an estimation unit configured to calculate an estimate of an offset value of the shake detection device using an observed offset value and an a priori offset estimate, the observed offset value being obtained using a difference between the output of the shake detection device and the motion vector; and a calculation unit configured to calculate a correction amount for correcting image blur using the output of the shake detection device and the estimate of the offset value, wherein the estimation unit is configured to calculate the estimate of the offset value according to operation for driving a movable lens.

18 Claims, 7 Drawing Sheets

IMAGE STABILIZATION APPARATUS, METHOD OF CONTROLLING THE SAME, IMAGE CAPTURING APPARATUS, AND STORAGE MEDIUM

BACKGROUND OF THE INVENTION

Field of the Invention

The present invention relates to a technique for correcting image blur caused by camera shake.

Description of the Related Art

A deterioration in image quality due to image blur caused by camera shake or the like is likely to be noticeable due to a reduction in the size of image capturing apparatuses and an increase in the magnification of optical systems. Therefore, in recent years, many image capturing apparatuses and imaging lenses are provided with an image stabilization function for correcting image blur.

This image stabilization function is realized by detecting the angular velocity of shake of an image capturing apparatus using an angular velocity sensor, and controlling the movement of a shake correction lens, an image sensor, and the like in response to angular velocity detection signals, for example. In this case, signals output by the angular velocity sensor include DC components (offset components) such as variations in reference voltages due to individual differences. If an angle signal is calculated by integrating a signal output from the angular velocity sensor with an offset component included in the output signal, integration errors accumulate due to the offset component, and shake cannot be accurately corrected.

In order to resolve this issue, Japanese Patent Laid-Open No. 2005-043780 discloses a method in which offset is estimated using the Kalman filter or recursive least squares using the output of the angular velocity sensor, and the motion vector due to the difference between image frames, and the velocity of a shake correction member as inputs. According to this method, it is possible to remove an offset component from the output of the angular velocity sensor, using the results of estimation.

However, the method disclosed in Japanese Patent Laid-Open No. 2005-043780 is problematic as follows. If an imaging optical system is adjusted by driving a movable lens such as a focus lens or a zoom lens in an image capturing apparatus, usually, the movable lens moves slightly in a direction that is different from the optical axis due to an error in the drive mechanism, and the optical axis of the imaging optical system may shift in some cases. When an offset value of the angular velocity sensor is estimated by a motion vector, if a movable lens is driven in such a manner, a motion component of an image resulting from the shift in the optical axis is superimposed on the motion vector as an error, and the actual motion vector representing the motion of the image capturing apparatus cannot be obtained. It is conceivable that, as a result, an error arises in the estimated offset value of the angular velocity sensor.

SUMMARY OF THE INVENTION

The present invention has been achieved in view of the above-described issues, and it is possible to suppress a decrease in estimation accuracy when an offset value of an angular velocity sensor is estimated using a motion vector.

According to a first aspect of the present invention, there is provided an image stabilization apparatus comprising: at least one processor or circuit configured to function as a first acquisition unit configured to acquire an output of a shake detection device configured to detect a shake of an image capturing apparatus; a motion vector detection unit configured to detect a motion vector from a plurality of images captured by the image capturing apparatus; an estimation unit configured to calculate an estimate of an offset value of the shake detection device using an observed offset value of the shake detection device and an a priori offset estimate of the shake detection device that has been estimated so far, the observed offset value being obtained using a difference between the output of the shake detection device and the motion vector; and a calculation unit configured to calculate a correction amount for correcting image blur using the output of the shake detection device and the estimate of the offset value; wherein the estimation unit is configured to calculate the estimate of the offset value according to operation for driving a movable lens in an imaging optical system that is used for image capturing operation of the image capturing apparatus.

According to a second aspect of the present invention, there is provided an image capturing apparatus comprising: an image sensor configured to capture an image of a subject; and an image stabilization apparatus including: at least one processor or circuit configured to function as a first acquisition unit configured to acquire an output of a shake detection device configured to detect a shake of the image capturing apparatus; a motion vector detection unit configured to detect a motion vector from a plurality of images captured by the image capturing apparatus; an estimation unit configured to calculate an estimate of an offset value of the shake detection device using an observed offset value of the shake detection device and an a priori offset estimate of the shake detection device that has been estimated so far, the observed offset value being obtained using a difference between the output of the shake detection device and the motion vector; and a calculation unit configured to calculate a correction amount for correcting image blur using the output of the shake detection device and the estimate of the offset value; wherein the estimation unit is configured to calculate the estimate of the offset value according to operation for driving a movable lens in an imaging optical system that is used for image capturing operation of the image capturing apparatus.

According to a third aspect of the present invention, there is provided a method of controlling an image stabilization apparatus comprising: acquiring an output of a shake detection device configured to detect a shake of an image capturing apparatus; detecting a motion vector from a plurality of images captured by the image capturing apparatus; calculating an estimate of an offset value of the shake detection device using an observed offset value of the shake detection device and an a priori offset estimate of the shake detection device that has been estimated so far, the observed offset value being obtained using a difference between the output of the shake detection device and the motion vector; and calculating a correction amount for correcting image blur using the output of the shake detection device and the estimate of the offset value; wherein, in the calculation of the estimate, the estimate of the offset value is calculated according to operation for driving a movable lens in an imaging optical system that is used for image capturing operation of the image capturing apparatus.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the present invention is applicable to optical devices such as video cameras, digital still cameras, and interchangeable lens thereof, and electronic devices having image capturing units.

Figure 1A:
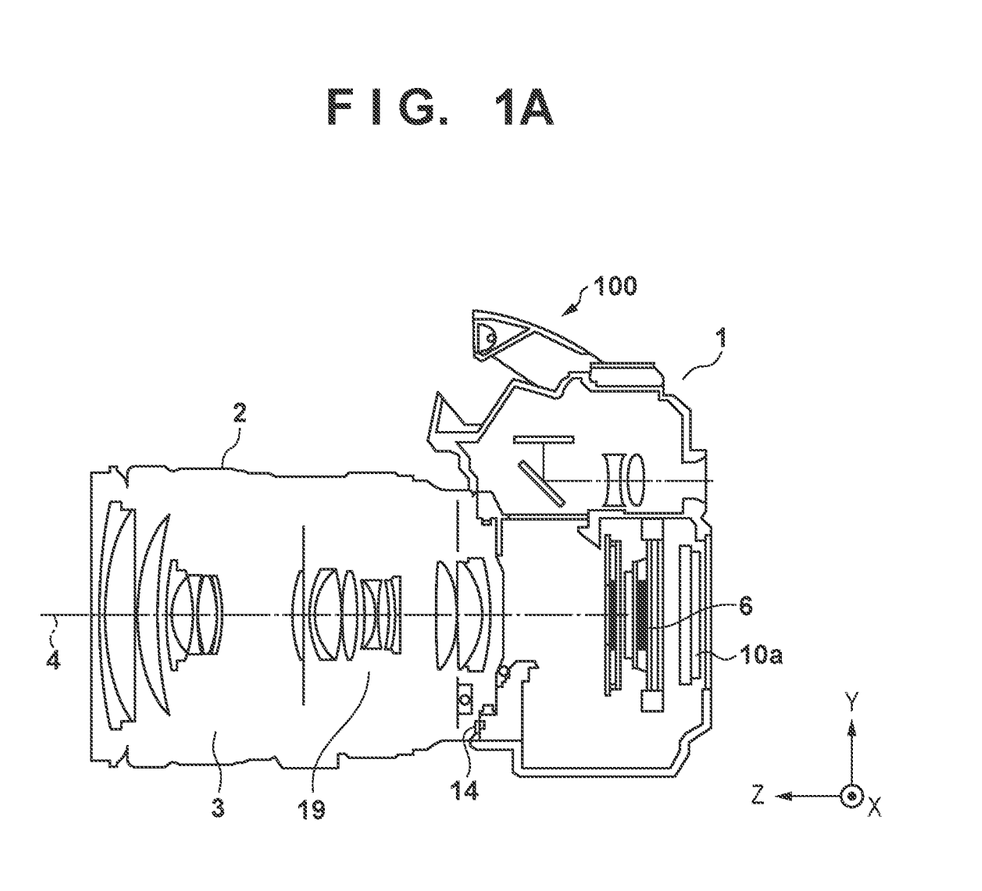
FIGS. 1A and 1B are diagrams showing a configuration of an image capturing apparatus according to one embodiment of the present invention.
Figure 1B:
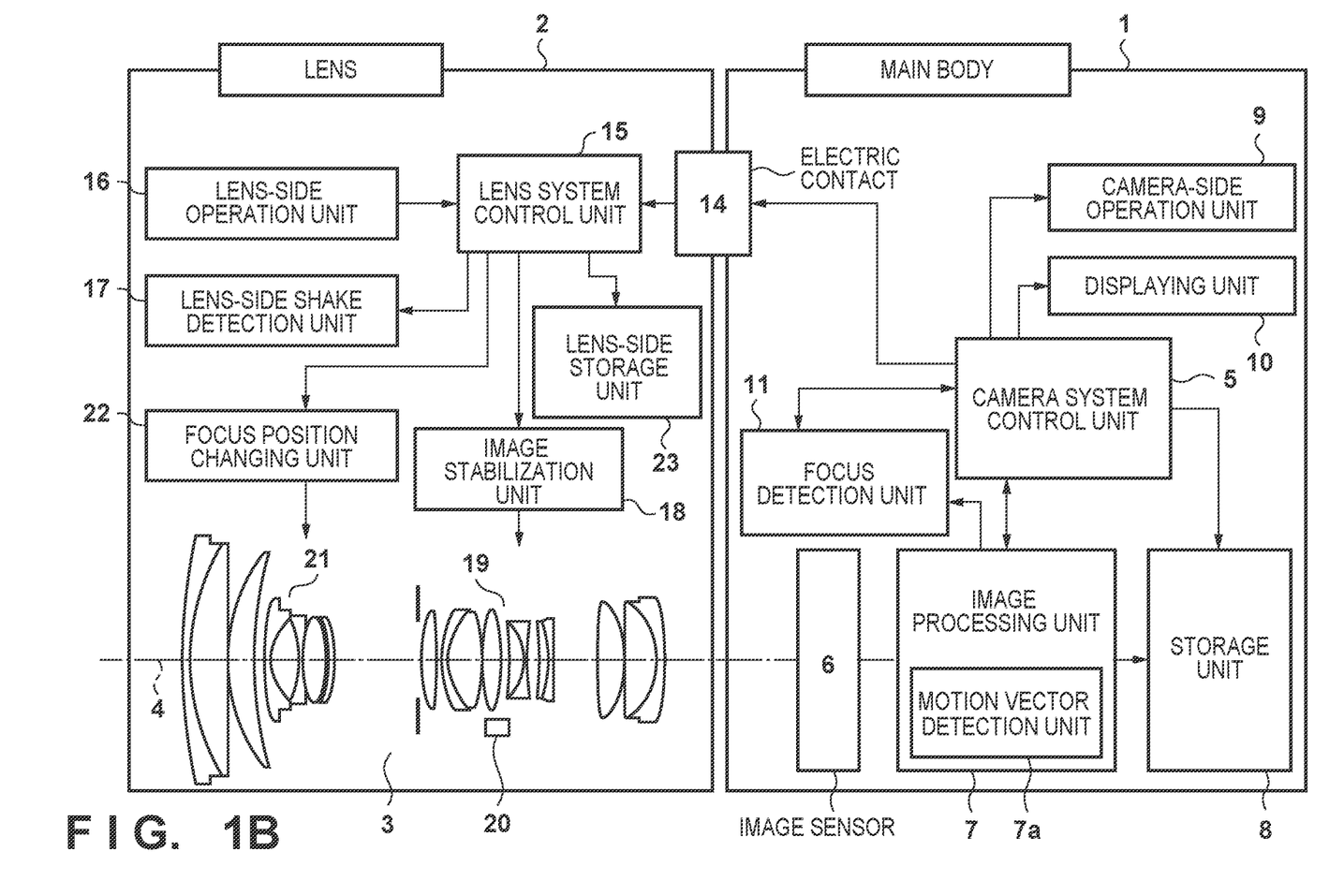

Referring to FIGS. 1A and 1B, an image capturing apparatus according to one embodiment of the present invention will be described below. FIG. 1A is a central cross-sectional view showing an overview of a configuration of the image capturing apparatus including an image stabilization apparatus according to this embodiment. FIG. 1B is a block diagram showing an electrical configuration of the image capturing apparatus. This embodiment will be described using an interchangeable-lens camera as an example. The subject side is defined as a front side and the positional relationship between portions will be described.

An image capturing apparatus 100 shown in FIG. 1A can capture images in a state in which a lens unit 2 is mounted on a main body 1 thereof. The lens unit 2 used in image capturing operation has an imaging optical system 3 constituted by a plurality of lenses, and an optical axis 4 indicates the optical axis of the imaging optical system 3. A correction lens unit 19 in the lens unit 2 includes a correction lens for correcting image blur in a captured image caused by user's camera shake or the like. An image sensor 6 is provided inside the main body 1, and a back display apparatus 10a is provided in a rear portion of the main body 1. An electric contact 14 electrically connects the main body 1 and the lens unit 2 to each other.

In FIG. 1B, the main body 1 includes a camera system control unit (referred to as a "camera control unit" hereinafter) 5, and the lens unit 2 includes a lens system control unit (referred to as a "lens control unit" hereinafter) 15. The camera control unit 5 and the lens control unit 15 can communicate with each other via the electric contact 14.

First, a configuration in the lens unit 2 will be described. A lens-side operation unit 16 includes an operation member to be operated by a user, and notifies the lens control unit 15 of a user operation instruction. A lens-side shake detection unit (referred to as a "shake detection unit" hereinafter) 17, which is a shake detection means, includes an angular velocity sensor, and detects the shake amount of the lens unit 2, and outputs a shake detection signal to the lens control unit 15. It is possible to detect rotation of the imaging optical system 3 in pitch, yaw, and roll directions with respect to the optical axis 4, using a gyro sensor, for example.

An image stabilization unit 18 corrects image blur by controlling the driving of a correction lens unit 19 according to a control command from the lens control unit 15. The correction lens unit 19 includes a correction lens that is shifted or tilted in a plane that is perpendicular to the optical axis 4, and a drive mechanism unit for driving the correction lens. A correction lens position detection unit 20 detects the position of the correction lens unit 19, and output a position detection signal to the lens control unit 15. A focus position changing unit 22 controls the driving of the focus lens 21 according to a control command from the lens control unit 15 to change the focus position of the imaging optical system 3.

A lens-side storage unit 23 includes a variance holding unit and an offset value holding unit, and can hold information regarding a variance value, an offset value, and the like, which will be described later, according to an instruction from the lens control unit 15.

Next, a configuration in the main body 1 of the image capturing apparatus 100 will be described. The image sensor 6 constituting an image capturing unit photoelectrically converts an optical image of a subject that is formed through the imaging optical system 3, and outputs an electrical signal. Object light in the field of view forms an image on an image capturing plane of the image sensor 6 via the imaging optical system 3, and an evaluation amount for focus adjustment and appropriate exposure amount can be obtained by the image sensor 6. The image sensor 6 can be exposed with an appropriate amount of object light by adjusting the imaging optical system 3, and a subject image is formed in the vicinity of the image sensor 6.

The image processing unit 7 acquires signals output by the image sensor 6, performs image processing, and performs processing for storing image data in a storage unit 8. The image processing unit 7 internally has an A (analog)/D (digital) converter, a white balance adjustment circuit, a gamma correction circuit, an interpolation arithmetic circuit, and the like, and generates image data for recording. The image processing unit 7 includes a color interpolation processing unit, and performs color interpolation (demosaicing) processing to generate color image data from Bayer array signals. Also, the image processing unit 7 compresses data regarding images, moving images, sounds, and the like using a predetermined compression method. The image processing unit 7 compares a plurality of images acquired by the image sensor 6, and acquires the amount of motion of the images by detecting a motion vector. That is to say, the image processing unit 7 includes a motion vector detection unit 7a that calculates a motion vector, which is the amount of motion based on the captured images.

A focus detection unit 11 performs focus detection operation using the images acquired by the image processing unit 7 to detect a focus state of a subject. Then, the focus detection unit 11 outputs the amount of movement of the focus lens 22 for achieving a focused state to the focus position changing unit 22 via the camera control unit 5.

The camera control unit 5 comprehensively controls the image capturing apparatus 100 constituted by the main body 1 and the lens unit 2. The camera control unit 5 controls the image processing unit 7 and the storage unit 8. A camera-side operation unit 9 includes an operation member, and notifies the camera control unit 5 of a user operation instruction. A displaying unit 10 includes the back display apparatus 10a, a small display panel (not shown) that is provided on an upper surface of the main body 1 and displays imaging information, an EVF (electronic viewfinder), and the like. The displaying unit 10 displays images according to a control command from the camera control unit 5, and presents image information and the like to a user. Processing for recording and reproducing image data is executed using the image processing unit 7 and the storage unit 8 under the control of the camera control unit 5. The captured image data is recorded on a recording medium, or is transmitted to an external apparatus through an external interface, for example.

Constituent units of the image capturing apparatus 100 are controlled by the camera control unit 5 and the lens control unit 15, and a still image and a moving image can be captured according to a user operation. The camera control unit 5 and the lens control unit 15 each includes a CPU (central processing unit), and control the operations of the constituent units and perform processing by executing predetermined programs. The lens control unit 15 communicates with the camera control unit 5, controls the driving of the correction lens unit 19, and performs a focus adjustment control, a diaphragm control, a zoom control, and the like by driving the focus lens 21, for example.

The camera control unit 5 generates a timing signal at the time of capturing an image, and the like, outputs the generated signal to constituent units, and executes image capturing processing, image processing, and recording and reproduction processing in response to the corresponding user operations. If a user operates a shutter release button included in the camera-side operation unit 9, for example, the camera control unit 5 detects a switch signal, and controls the image sensor 6, the image processing unit 7, and the like. Furthermore, the camera control unit 5 controls an information display device provided in the displaying unit 10. Also, the back display apparatus 10a includes a touch panel on a display screen unit, detects a user operation, and notifies the camera control unit 5 of the user operation. In this case, the back display apparatus 10a has both an operation function and a display function.

Next, an operation for adjusting the imaging optical system 3 will be described. The image processing unit 7 acquires signals output by the image sensor 6, and obtains appropriate focus position and diaphragm position of the imaging optical system 3 based on operation of a user photographer performed using the camera-side operation unit 9. The camera control unit 5 transmits a control command to the lens control unit 15 via the electric contact 14. The lens control unit 15 appropriately controls a focal length changing unit 22 and a diaphragm driving unit (not shown) in accordance with a control command from the camera control unit 5.

If an image stabilization mode is set, the lens control unit 15 starts to control image stabilization when accepting a command to transition to an image stabilization mode from the camera control unit 5. The lens control unit 15 acquires a shake detection signal from a shake detection unit 17, acquires a position detection signal from a correction lens position detection unit 20, and controls the image stabilization unit 18. The image stabilization unit 18 drives the correction lens unit 19 by an actuator in which a magnet and a flat plate coil are used, for example. The correction lens position detection unit 20 includes a magnet and a Hall element, for example. As a specific control method, first, the lens control unit 15 acquires a shake detection signal from the shake detection unit 17, and calculates a drive amount (correction amount) of the correction lens unit 19 for performing image stabilization. The lens control unit 15 outputs the calculated drive amount as a command value to the image stabilization unit 18, and drives the correction lens unit 19. A feedback control is performed such that a position detected by the correction lens position detection unit 20 follows the command value.

Figure 2:
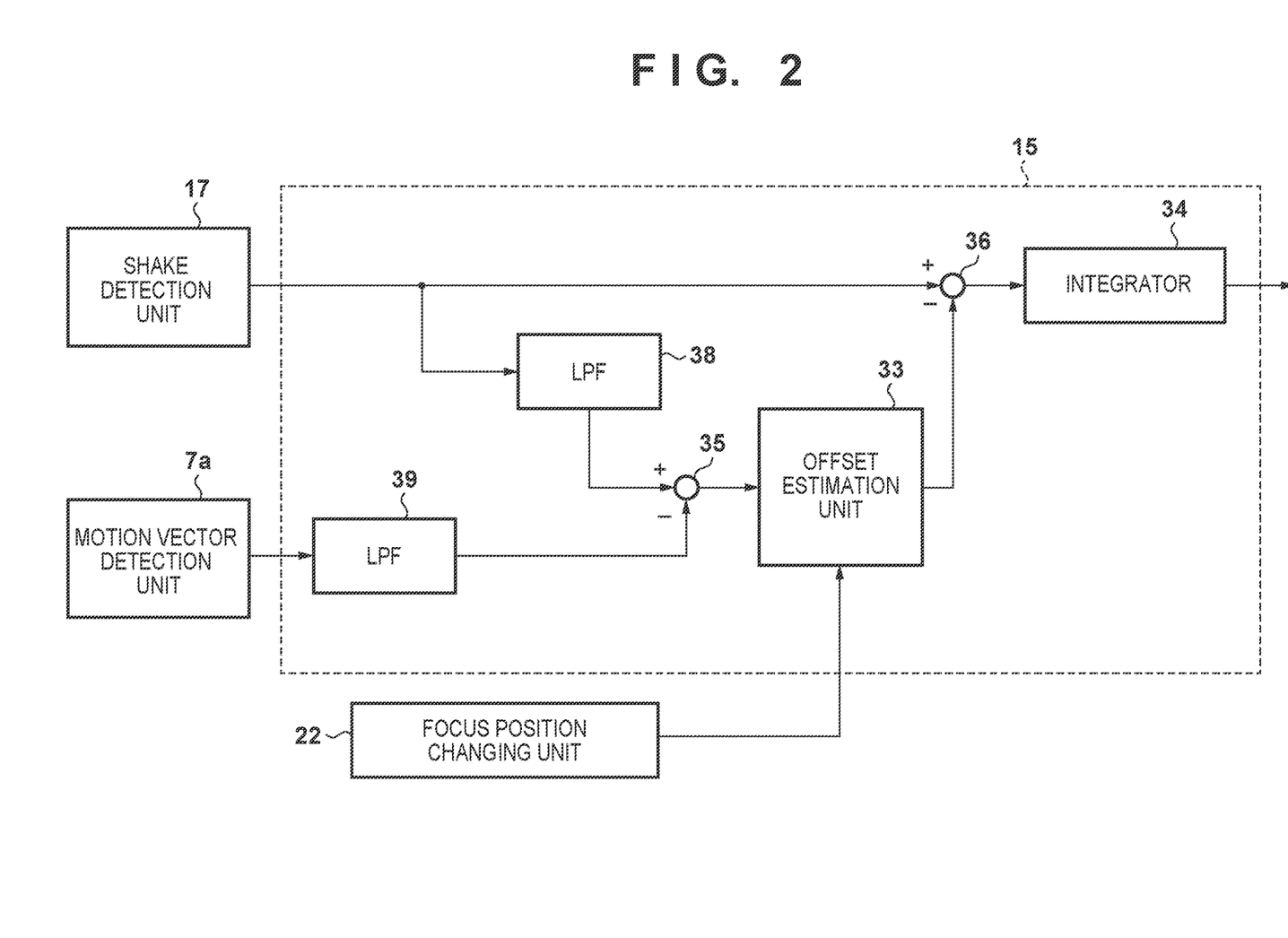
FIG. 2 is a block diagram showing a configuration of an image stabilization control unit in one embodiment.

FIG. 2 is a block diagram showing a configuration example relating to an image stabilization control in the lens control unit 15. Note that the pitch direction, yaw direction, and roll direction axes have the same configuration as image stabilization axes, and thus only one axis will be described below.

In FIG. 2, the range surrounded by a broken line is included in the lens control unit 15. The shake detection unit 17 detects shake occurring in the image capturing apparatus 100, and outputs a shake detection signal to a subtractor 36 and an LPF (lowpass filter) 38. The LPF 38 cuts off a high-frequency band of the shake detection signal, and outputs the resulting signal to a subtractor 35. The motion vector detection unit 7a detects a motion vector from the plurality of captured images, and outputs a motion vector detection signal to a LPF 39. The cutoff band of the LPF 39 is set to the same cutoff band as the LPF 38, and cuts off a high-frequency band of the motion vector detection signal, and outputs the resulting signal to the subtractor 35.

The subtractor 35 subtracts the band-limited vector detection signal of the motion vector detection unit 7a from the band-limited shake detection signal of the shake detection unit 17, and outputs the resulting signal to an offset estimation unit 33. The focus position changing unit 22 calculates the drive amount of the focus lens 21 and drives the focus lens 21 according to the results of focus detection operation, which will be described later, and outputs a driving timing signal to the offset estimation unit 33.

The offset estimation unit 33 estimates an offset component of the signal output by the shake detection unit 17 using the Kalman filter based on the output of the subtractor 35 and the output of the focus position changing unit 22, and outputs the estimated offset value to the subtractor 36. A calculation method of the offset estimation unit 33 will be described later in detail.

The subtractor 36 subtracts the offset value of the offset estimation unit 33 from the signal output by the shake detection unit 17, and outputs the resulting signal to an integrator 34. The integrator 34 performs integration processing on the signal output by the subtractor 36. The signal output by the integrator 34 is output as an image stabilization drive amount of the correction lens unit 19.

As described above, although the offset value of the shake detection unit 17 is estimated by the difference between the shake detection unit 17 and the motion vector detection unit 7a, if the focus lens is driven through focus detection operation at the time of motion vector detection, the following issues arise.

The focus lens (movable lens) is configured to adjust a focus position through mechanical drive. Thus, at the time of driving the focus lens, the center of the focus lens moves in a direction that is substantially orthogonal to the optical axis due to an error in the drive mechanism. That is, the optical axis shifts. If the optical axis shifts in a state in which an image of a given subject is captured, the subject image moves in a direction that is substantially orthogonal to the optical axis on an image plane of the image sensor 6. As a result, the signal detected by the motion vector detection unit 7a includes the movement of the image due to the shift in the optical axis in addition to the shake of the image capturing apparatus 100 caused by camera shake. Therefore, even if the difference between this signal and the signal detected by the shake detection unit 17 included in the offset component is obtained, an accurate offset component cannot be obtained, and a value that includes the amount of movement of the image due to the shift in the optical axis will be calculated.

FIGS. 3 and 4A to 4C are schematic diagrams of signals showing the offset component of the shake detection signal and the influence of shift in the optical axis due to the movement of the focus lens.

Figure 3:
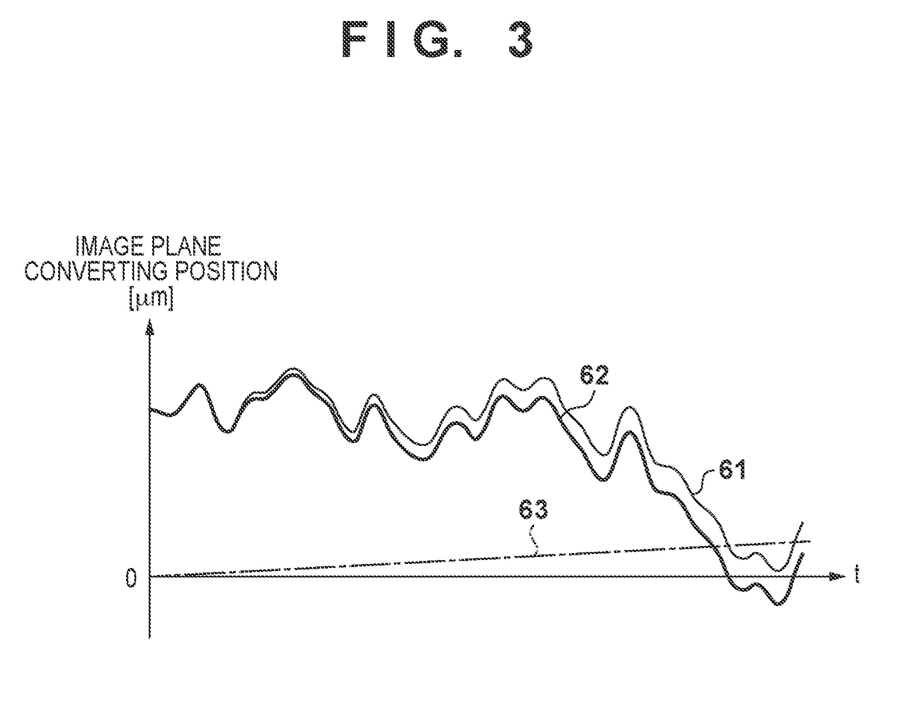
FIG. 3 is a diagram illustrating an offset component of a shake detection signal.

FIG. 3 shows a state in which the focus lens is not driven where the horizontal axis indicates the time, and the vertical axis indicates the position of an image plane [μm]. In FIG. 3, a thin line 61 indicates a value obtained by integrating the shake signal output of the shake detection unit 17 and converting the resulting value into the movement amount on the image plane, and a thick line 62 indicates a value obtained by converting the vector detection signal of the motion vector detection unit 7a into the movement amount on the image plane. Also, a chain line 63 indicates a value obtained by subtracting the value of the thick line 62 from the value of the thin line 61, and indicates the offset component of the shake detection unit 17. Because the signal of the shake detection unit 17 includes the offset component, as indicated by the chain line 63, errors are added up due to the signal being integrated.

Figure 4A:
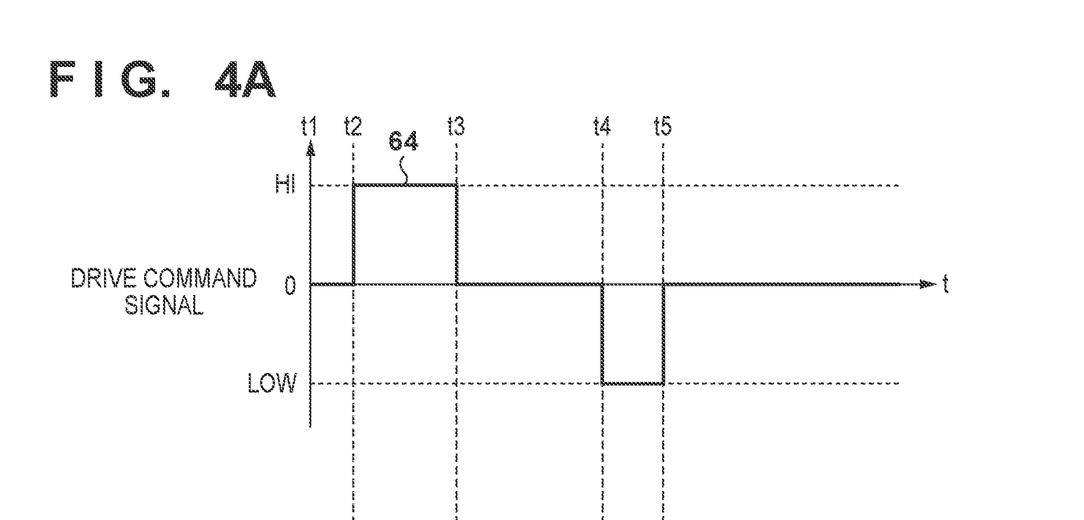
FIGS. 4A to 4C are diagrams illustrating movement of an optical axis on an image plane due to shift in the optical axis of a focus lens.

On the other hand, in FIG. 4A, a waveform 64 indicates the timing when a focus lens drive command is issued by the focus position changing unit 22, and the horizontal axis indicates the time, and the vertical axis indicates HI and LOW of the drive command signal. If the drive command signal is HI, the focus lens 21 is moved to the infinity side, and if the drive command signal is LOW, the focus lens 21 is moved to the near side, and if the drive command signal is 0, the focus lens 21 is stopped.

Figure 4B:
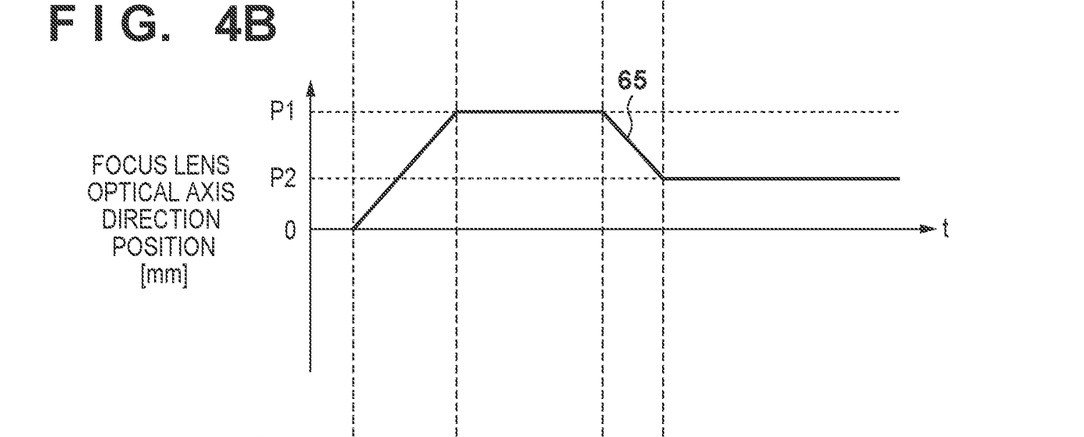

In FIG. 4B, a waveform 65 indicates the movement of the focus lens in the optical axis direction, the horizontal axis indicates the time, and the vertical axis indicates a movement position of the focus lens in the optical axis direction. The position 0 on the vertical axis is the reference position of the focus lens 21, a positive direction indicates the direction from the reference position toward the infinity side, and a negative direction indicates the direction from the reference direction toward the near side.

Figure 4C:
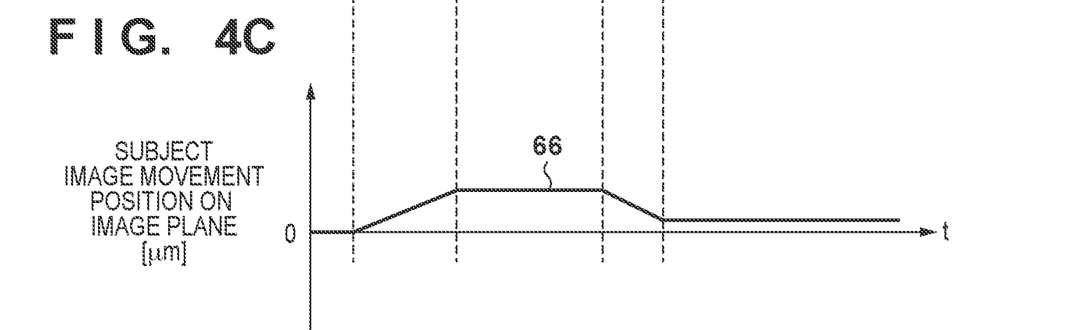

In FIG. 4C, a waveform 66 indicates the movement amount of a subject image due to shift in the optical axis accompanying the movement of the focus lens 21, the horizontal axis indicates the time, and the vertical axis indicates the movement amount of a subject image (the movement amount of the subject image on the image plane) in a direction orthogonal to the optical axis accompanying shift in the optical axis. The position 0 on the vertical axis indicates the center of the image sensor 6, the negative direction of the vertical axis indicates the movement of the subject image in the negative direction of the Y-axis (see FIGS. 1A and 1B), and the positive direction of the vertical axis indicates the movement of the subject image in the positive direction of the Y-axis. The times on the horizontal axis in FIGS. 4A, 4B, and 4C are synchronized with each other, and the timing of the drive command issued to the focus lens 21, the movement of the focus lens 21 in the optical axis direction, and the movement amount of the subject image on the image plane due to shift in the optical axis are shown such that the time axes thereof coincide with each other. Note that, although shift in the optical axis causes the movement of the subject image in the X-axis direction (see FIGS. 1A and 1B) in addition to the movement thereof in the Y-axis direction shown in FIG. 4C, the movement in the X-axis direction is the same as the movement in the Y-axis, and thus, will not be described.

At time t1, the focus lens 21 is in a stopped state.

At time t2, when the drive command signal shown in FIG. 4A is HI and the focus lens 21 moves from the reference position to the infinity side, the subject image moves on the image plane due to shift in the optical axis accompanying the movement of the focus lens 21.

At time t3, when the drive command signal shown in FIG. 4A is 0 and the focus lens 21 reaches a desired position P1, driving of the focus lens 21 is stopped.

At time t4, when the drive command signal is LOW and the focus lens 21 moves to the near side this time, the subject image moves on the image plane due to shift in the optical axis again.

At time t5, when the drive command signal is 0 and the focus lens 21 reaches a desired position P2, driving of the focus lens 21 is stopped.

As a result of the focus lens 21 moving in response to the reception of a drive command in this manner, the subject image moves on the image plane due to shift in the optical axis of the focus lens, and the movement amount of the subject image on the image plane is superimposed on the motion vector detection signal indicated by the thick line 62 in FIG. 3. As a result, the accuracy in offset estimation decreases, and shake correction accuracy decreases.

In view of this, in this embodiment, if the focus lens 21 has received the drive command signal timing from the focus position changing unit 22, processing for reducing the reliability of the result of offset estimation performed by the offset estimation unit 33 is performed in a time period in which the focus lens 21 is driven. Accordingly, even if the focus lens 21 is driven, it is possible to suppress a decrease in the accuracy in estimation of an offset value.

Next, processing for calculating a shake correction drive amount of the image stabilization unit 18 in the image capturing apparatus 100 will be described with reference to the flowcharts shown in FIGS. 5 and 6. The flowchart shown in FIG. 5 is repeatedly executed in each image acquisition cycle in the image processing unit 7.

Figure 5:
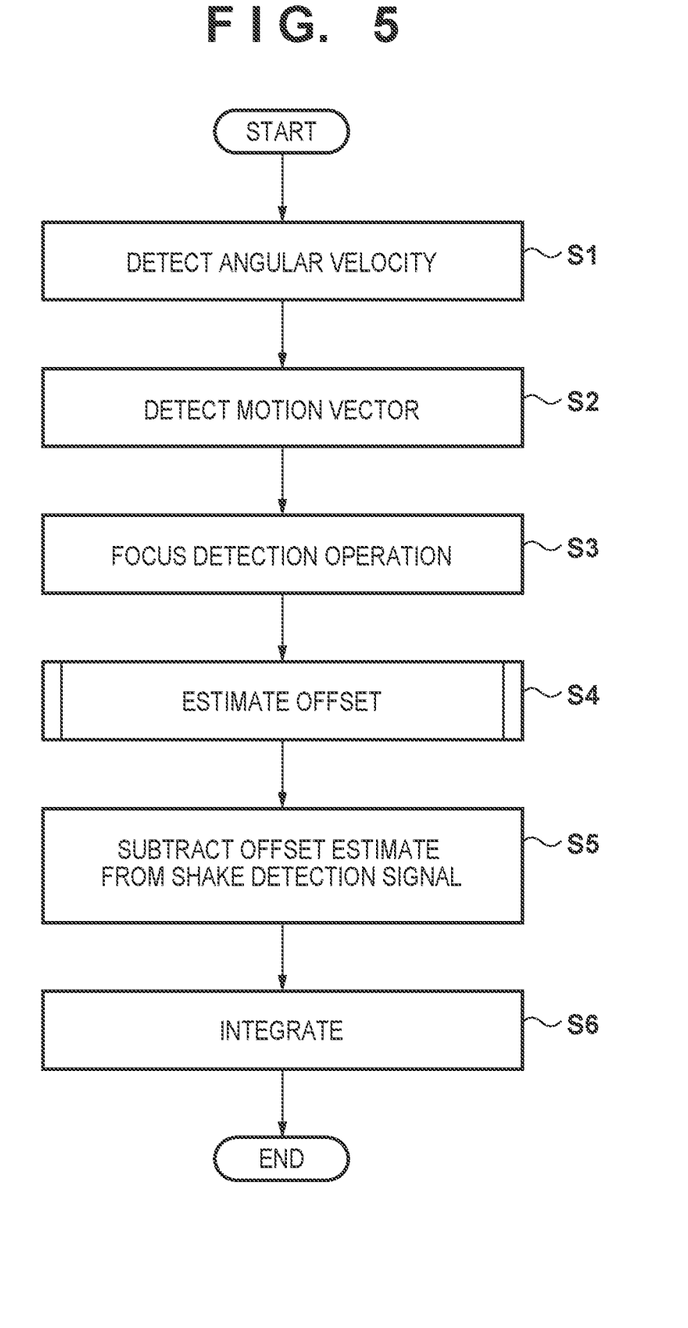
FIG. 5 is a flowchart illustrating calculation of an image stabilization drive amount in one embodiment.

When the flow in FIG. 5 is started, the shake detection unit 17 detects the shake of the image capturing apparatus 100 in step S1.

In step S2, the motion vector detection unit 7a detects a motion vector using the acquired image and an image acquired one frame before the acquired image.

In step S3, the focus detection unit 11 performs focus detection operation to detect the focus state of a subject. Then, the focus lens 21 is moved by the focus position changing unit 22 according to the focus state.

In step S4, the offset estimation unit 33 estimates the offset component included in the shake detection signal. A subroutine for the offset estimation processing performed in step S4 is formed, and will be described later using FIG. 6.

In step S5, the subtractor 36 subtracts an offset estimate that is output from the offset estimation unit 33 from the shake detection signal output from the shake detection unit 17.

In step S6, the integrator 34 performs integration processing on the shake detection signal from which the offset has been removed, and outputs the resulting value as the image stabilization drive amount to the image stabilization unit 18.

Next, offset estimation processing will be described using mathematical formulas. First, estimation of an offset value through offset processing will be described using mathematical formulas. If the offset estimation unit 33 is constructed by a known linear Kalman filter, the general formula of the linear Kalman filter can be expressed by Formulas (1) to (7) below.

$$x_t = Ax_{t-1} + Bu_t + \varepsilon_t \quad \text{Formula (1)}$$

$$z_t = Cx_t + \delta_t \quad \text{Formula (2)}$$

Here, Formula (1) represents the behavioral model in the state-space representation, and Formula (2) represents the observation model. "A" represents a system matrix in the behavioral model, and "B" represents an input matrix. Also, "C" represents an output matrix in the observation model, and these are each expressed by a determinant. Also, $\varepsilon_t$ is process noise. $\delta_t$ is observation noise, and t represents discrete time.

$$\hat{x}_t^- = A\hat{x}_{t-1} + Bu_t \quad \text{Formula (3)}$$

$$\hat{P}_t^- = A\hat{P}_{t-1}A^T + \Sigma_x \quad \text{Formula (4)}$$

Here, Formula (3) represents the a priori estimate in a prediction step, and Formula (4) represents the a priori error covariance. Also, $\Sigma_x$ represents noise variance of the behavioral model.

$$K_t = \frac{\hat{P}_t^- C^T}{\left(C\hat{P}_t^- C^T + \Sigma_z\right)} \quad \text{Formula (5)}$$

$$\hat{x}_t = \hat{x}_t^- + K_t(z_t - C\hat{x}_t^-) \quad \text{Formula (6)}$$

$$\hat{P}_t = (I - K_t C)\hat{P}_t^- \quad \text{Formula (7)}$$

Here, Formula (5) represents a formula for calculating Kalman gain in a filtering step, and the subscript T represents a transposed matrix. Furthermore, Formula (6) represents the a posteriori estimate by the Kalman filter, and Formula (7) represents the a posteriori error covariance. Also, L represents noise variance of the observation model.

In this embodiment, in order to estimate the offset of the shake detection unit 17, the offset value is set to $x_t$, and the offset value obtained from the observed shake amount is set to $z_t$. The model of the offset component does not have the input term $u_t$ in Formula (1), and can be represented by the following simple linear model where A=C=1 holds true in Formulas (1) and (2).

$$x_t = x_{t-1} + \varepsilon_t \quad \text{Formula (8)}$$

$$z_t = x_t + \delta_t \quad \text{Formula (9)}$$

Here, the noise variance $\Sigma_x$ of the behavioral model in Formula (4) is represented by system noise variance $\sigma_x^2$, and the noise variance $\Sigma_z$ of the observation model in Formula (5) is represented by observation noise variance $\sigma_z^2$.

Also, the Kalman filter can be constructed using the following formulas where the a priori offset estimate at time t is $\hat{x}_t^-$, the a priori error variance is $\sigma_{\hat{x}_t^-}^2$, Kalman gain is $k_t$, observation noise variance is $\sigma_{zt}^2$, and the offset observed by the shake detection unit 17 and the motion vector detection unit 7a is $z_t$.

$$\hat{x}_t^- = \hat{x}_{t-1} \quad \text{Formula (10)}$$

$$\sigma_{\hat{x}_t^-}^2 = \sigma_{\hat{x}_{t-1}}^2 + \sigma_x^2 \quad \text{Formula (11)}$$

$$k_t = \frac{\sigma_{\hat{x}_t^-}^2}{\sigma_{\hat{x}_t^-}^2 + \sigma_{zt}^2} \quad \text{Formula (12)}$$

$$\hat{x}_t = \hat{x}_t^- + k_t(z_t - \hat{x}_t^-) \quad \text{Formula (13)}$$

$$\sigma_{\hat{x}_t}^2 = (1 - k_t)\sigma_{\hat{x}_t^-}^2 \quad \text{Formula (14)}$$

The offset estimation unit 33 is constructed by the above-described arithmetic formulas (10) to (14). As shown in Formula (10), the a priori offset estimate $\hat{x}_t^-$ is calculated using the offset estimate $\hat{x}_{t-1}$ at time t−1 in a cycle in which the estimation calculation is updated. As shown in Formula (11), the a priori error variance $\sigma_{\hat{x}_t^-}^2$ is calculated using the a posteriori error variance $\sigma_{\hat{x}_{t-1}}^2$ and the system noise variance $\sigma_x^2$ at time t−1.

Then, as shown in Formula (12), the Kalman gain $k_t$ is calculated based on the a priori error variance $\sigma_{\hat{x}_t^-}^2$ and observation noise variance $\sigma_{zt}^2$.

Then, using Formula (13), the a priori offset estimate $\hat{x}_t^-$ is modified by a value obtained by multiplying the error between the observed offset $z_t$ and the a priori offset estimate $\hat{x}_t^-$ by the Kalman gain $k_t$, and the offset estimate $\hat{x}_t$ is calculated. Also, the a priori error variance $\sigma_{\hat{x}_t^-}^2$ is modified using Formula (14), and the a posteriori error variance $\sigma_{\hat{x}_t}^2$ is calculated. The offset estimate is calculated by repeating the update and modification of the a priori estimate for each calculation cycle through these calculations.

Next, the subroutine of the offset estimation processing at time t1 will be described using the flowchart shown in FIG. 6.

Figure 6:
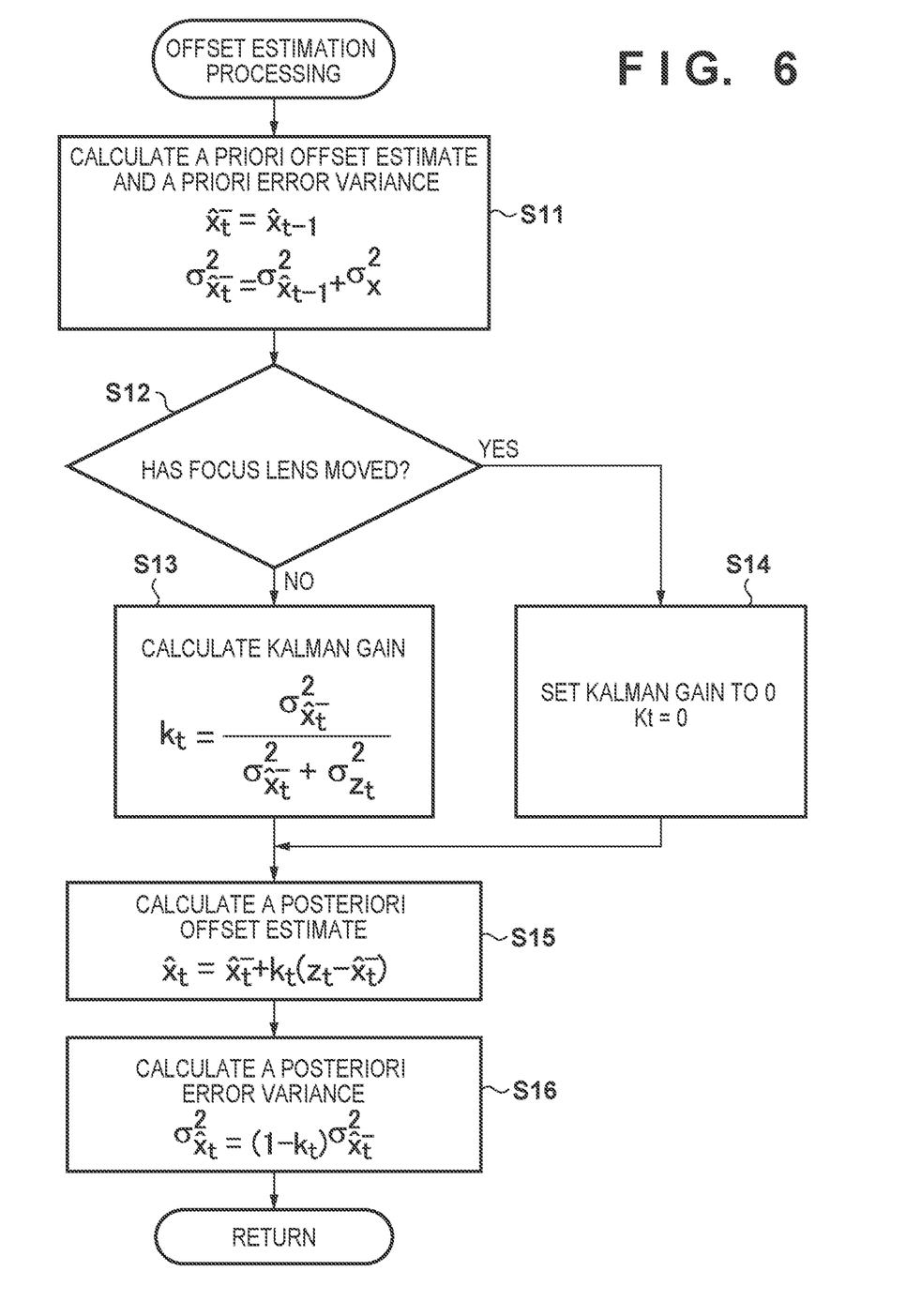
FIG. 6 is a flowchart illustrating an offset estimation calculation in one embodiment.

When the flow shown in FIG. 6 is started, in step S111, the offset estimation unit 33 calculates the a priori offset estimate $\hat{x}_t^-$ and the a priori error variance $\sigma_{\hat{x}_t^-}^2$ using Formulas (10) and (11).

In step S12, through the focus detection operation in step S3 shown in FIG. 5, it is determined whether or not the focus lens 21 has moved since the previous motion vector detection. If the focus lens 21 has not moved, the processing proceeds to step S13, and if the focus lens 21 has moved, the processing proceeds to step S14.

In step S13, the offset estimation unit 33 calculates Kalman gain $k_t$ using Formula (12) based on the a priori error variance $\sigma_{\hat{x}_t^-}^2$ and the observation noise variance $\sigma_{zt}^2$.

On the other hand, in step S14, because the movement of the focus lens 21 has been detected, the offset estimation unit 33 sets the Kalman gain $k_t$ to 0 in order to reduce the reliability of the observed offset value $z_t$ used to estimate the offset using the subsequent Formula (13).

In step S15, the offset estimation unit 33 calculates the a posteriori offset estimate $\hat{x}_t$ using Formula (13).

In step S16, the offset estimation unit 33 calculates the a posteriori error variance $\sigma_{\hat{x}_t}^2$ using Formula (14).

The flow of the subroutine ends as described above.

In this embodiment, if the movement of the focus lens 21 has been detected in step S12, it is determined that the reliability of the observed offset value $z_t$ is low, and the Kalman gain $k_t$ is set to 0 in step S14. By setting the Kalman gain $k_t$ to 0, the a posteriori offset estimate $\hat{x}_t$ calculated in step S15 is equal to the a priori offset estimate $\hat{x}_t^-$, which is the previous a posteriori offset estimate $\hat{x}_t$. Therefore, it is possible to perform offset estimation without the a posteriori offset estimate $\hat{x}_t$ in Formula (13) being affected by the low-accurate observed offset value $z_t$ that includes the influence of movement of a subject image on the image plane due to shift in the optical axis.

Accordingly, even if the focus lens 21 is driven, it is possible to suppress a decrease in the accuracy in estimation of the offset value. Note that setting of the Kalman gain to 0 is synonymous with stopping of offset estimation such that offset estimation is not performed using a motion vector. In this embodiment, if the reliability of the observed offset value has decreased, the offset is estimated by suppressing the influence of the observed offset value $z_t$ by reducing the Kalman gain $k_t$.

In this embodiment, although offset estimation is performed with a Kalman gain $k_t$ of 0 in a time period in which the focus lens 21 is driven by the focus position changing unit 22, instead of 0, a value obtained by multiplying the Kalman gain obtained in step S13 by a coefficient of less than 1 may be used (In S 13, the coefficient is taken to be 1.), for example. Also, the reliability of the observed offset value may be reduced using other method. In the time period in which the focus lens 21 is driven, the Kalman gain obtained using Formula (12) may be reduced by setting the system noise variance $\sigma_x^2$ in Formula (11) to a predetermined value that is larger than that in the other time period, for example.

Also, the reliability of the observed offset value may be reduced according to the velocity (driving velocity) of the focus lens 21 driven by the focus position changing unit 22. If the focus state of a subject is unlikely to change and the focus lens 21 moves slowly, the amount of movement of a subject image on the image plane due to shift in the optical axis between acquired frames is smaller than that in a case where the moving velocity is high. That is, the ratio of decrease in the accuracy in estimating the offsets caused by the shift in the optical axis due to the movement of the focus lens 21 decreases. In view of this, processing for reducing the reliability of the result of offset estimation may be performed according to the moving velocity of the focus lens 21. If a moving velocity Vt is higher than or equal to a predetermined value Vk (a predetermined value or higher), the Kalman gain is set to 0, for example, whereas if the moving velocity Vt is less than Vk, the Kalman gain obtained using Formula (13) may be multiplied by a coefficient αk according to the moving velocity obtained using Formula (15).

$$\alpha k = 1 - Vt/Vk \quad \text{Formula (15)}$$

Also, if the moving position of the subject image (optical axis) on the image plane due to shift in the optical axis of the focus lens with respect to the position of the focus lens 21 in the optical axis direction is known in advance, the following processing may be performed.

There is a correlation between the position of the focus lens 21 in the optical axis direction and the corresponding position of the optical axis on the image plane due to shift in the optical axis of the focus lens, although the correlation changes depending on a drive mechanism or an actuator type. Note that the position of the optical axis on the image plane refers to a position on the XY-plane through which the optical axis passes when the image plane of the image sensor 6 is the XY-plane and the center of the image sensor 6 is the origin, and the position of the optical axis on the image plane moves due to shift in the optical axis of the focus lens.

When the focus lens mechanism has a high correlation, the position of the optical axis on the image plane due to shift in the optical axis of the focus lens can be obtained by detecting the position of the focus lens 21 in the optical axis direction. In view of this, the position of the optical axis on the image plane with respect to the position of the focus lens 21 in the optical axis direction is measured in advance, and the measured position is recorded in the lens-side storage unit 23 as optical axis shift information. Then, when the focus lens 21 is driven by the focus position changing unit 22, the position of the focus lens 21 in the optical axis direction is detected. Then, the position of the optical axis on the image plane that corresponds to the position of the focus lens 21 in the optical axis direction that is optical axis shift information is read out from the lens-side storage unit 23, and the amount of movement of the optical axis, which indicates how much the position of the optical axis has moved since the previous image acquisition, is calculated. Then, if the amount of optical axis movement since the previous image acquisition is less than a threshold, it is determined that the amount of optical axis movement is unlikely to affect the detection made by the motion vector detection unit 7a, and the reliability of the observed offset value in the offset estimation unit 33 is maintained without being reduced. On the other hand, if the amount of optical axis movement is more than or equal to the threshold, a control may be performed to reduce the reliability of the observed offset value.

Note that, as a method for reducing the reliability thereof, the Kalman gain may be uniformly set to 0, or the Kalman gain calculated using Formula (13) may be multiplied by a coefficient such that the Kalman gain decreases as the amount of optical axis movement increases.

Measurement may be made in a process for producing the lens unit 2, and optical axis shift information may be recorded in the lens-side storage unit 23. Also, a configuration may be adopted in which a guide is displayed on the displaying unit 10 so that the user fixes a camera on a tripod or the like to achieve a statically determinate state, motion vectors are detected when the focus lens 21 is successively moved, and optical axis shift information is recorded.

Also, if optical axis shift information has been stored as described above, the amount of optical axis movement on the image plane due to shift in the optical axis of the focus lens may be subtracted from the output of the motion vector detection unit 7a shown in FIG. 2 according to the movement of the focus lens 21 in the optical axis direction, and the resulting value may be output to the LPF 39. However, the position of the optical axis on the image plane according to the position of the focus lens 21 in the optical axis direction recorded in the optical axis shift information has an error due to aging, a change in temperature, and the like. In view of this, although the reliability of the observed offset value in the offset estimation unit 33 is reduced more in the time period in which the focus lens 21 is driven than in a time period in which the focus lens 21 is not driven, the range of reducing the reliability may be smaller than that of a lens unit having no optical axis shift information.

Although the driving of the focus lens 21 has been described as an example of the operation of driving the imaging optical system that causes the optical axis to shift in this embodiment, the present invention is also effective for other driving operations such as driving of a zoom lens or the like as long as it is the operation of driving the imaging optical system that causes the optical axis to shift.

Variations

Although the lens unit 2 has the image stabilization unit 18 and performs image stabilization by moving the correction lens unit in the above-described embodiment, the method for performing image stabilization is not limited to this method. It is conceivable that an image sensor shift driving unit capable of translationally moving the image sensor 6 of the image capturing apparatus 100 in a direction that is substantially orthogonal to the optical axis is arranged, and the image sensor 6 is translationally driven according to the image stabilization drive amount obtained as described above, for example. Note that the translational drive amount of the image sensor 6 is multiplied by a given coefficient according to the focal length of the lens unit 2, and the resulting value is converted into the amount of movement thereof on the image capturing plane due to shake. Also, both the image sensor 6 and the lens unit 2 may have shake correction means. Furthermore, processing for estimating offset in the above-described embodiment is also effective for so-called electronic image stabilization processing for cutting out the position of each frame in capturing of moving images.

Also, the method of the above-described embodiment is effective at the time of capturing moving images in which the motion vector is constantly acquired, and focus detection operation and focus lens drive are constantly performed, and also effective in aiming operation during so-called live view display before a still image is captured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-051775 filed Mar. 23, 2020 which is hereby incorporated by reference herein in its entirety.

What is claimed is:

1. An image stabilization apparatus comprising:
at least one processor or circuit configured to function as
a first acquisition unit configured to acquire an output of a shake detection device configured to detect a shake of an image capturing apparatus;
a motion vector detection unit configured to detect a motion vector from a plurality of images captured by the image capturing apparatus;
an estimation unit configured to calculate an estimate of an offset value of the shake detection device using an observed offset value of the shake detection device and an a priori offset estimate of the shake detection device that has been estimated so far, the observed offset value being obtained using a difference between the output of the shake detection device and the motion vector; and
a calculation unit configured to calculate a correction amount for correcting image blur using the output of the shake detection device and the estimate of the offset value;
wherein the estimation unit is configured to calculate the estimate of the offset value according to operation for driving a movable lens in an imaging optical system that is used for image capturing operation of the image capturing apparatus.

2. The image stabilization apparatus according to claim 1, wherein, if the movable lens has been driven at a point of time when the motion vector is detected, the estimation unit reduces a reliability of the observed offset value and calculates the estimate of the offset value.

3. The image stabilization apparatus according to claim 2, wherein, if a driving velocity of the movable lens is higher than or equal to a predetermined value, the estimation unit reduces the reliability of the observed offset value and calculates the estimate of the offset value.

4. The image stabilization apparatus according to claim 1, wherein, if the movable lens has been driven at a point of time when the motion vector is detected, the estimation unit calculates the estimate of the offset value by multiplying the observed offset value by a coefficient that is smaller than 1.

5. The image stabilization apparatus according to claim 1, wherein, if the movable lens has been driven at a point of time when the motion vector is detected, the estimation unit calculates the estimate of the offset value by multiplying the observed offset value by a coefficient that is smaller than a coefficient to be multiplying if the movable lens has not been driven at the point of time when the motion vector is detected.

6. The image stabilization apparatus according to claim 1, wherein, if the movable lens has been driven at a point of time when the motion vector is detected, the estimation unit does not calculate the estimate of the offset value.

7. The image stabilization apparatus according to claim 1, wherein the calculation unit is configured to calculate the correction amount based on a difference between the output of the shake detection device and the estimate of the offset value.

8. The image stabilization apparatus according to claim 1, wherein the correction amount is a drive amount by which a shake correction lens that is the image stabilization device and is provided in the imaging optical system is driven.

9. The image stabilization apparatus according to claim 1, wherein the correction amount is a drive amount by which a mechanism for moving an image sensor disposed in the image capturing apparatus that is the image stabilization device is driven.

10. The image stabilization apparatus according to claim 1, wherein the at least one processor or circuit is configured to further function as
a second acquisition unit configured to acquire information regarding shift in an optical axis on an image plane that corresponds with each position of the movable lens when the plurality of images are captured,
wherein, if the shift in the optical axis is more than or equal to a threshold, the estimation unit reduces the reliability of the observed offset value and calculates the estimate of the offset value.

11. The image stabilization apparatus according to claim 1, wherein the at least one processor or circuit is configured to further function as
a second acquisition unit configured to acquire information regarding shift in an optical axis on an image plane that corresponds with each position of the movable lens when the plurality of images are captured,
wherein, if the shift of the optical axis is more than or equal to a threshold, the estimation unit calculates the estimate of the offset value by multiplying the observed offset value by a coefficient that is smaller than a coefficient to be multiplying if the shift of the optical axis is less than the threshold.

12. The image stabilization apparatus according to claim 1, wherein the at least one processor or circuit is configured to further function as
a second acquisition unit configured to acquire information regarding shift in an optical axis on an image plane that corresponds with each position to which the movable lens moves,
wherein the estimation unit is configured to calculate the estimate of the offset value by subtracting a movement amount of a subject image that corresponds with the shift in the optical axis from the motion vector.

13. The image stabilization apparatus according to claim 1,
wherein the operation for driving the movable lens is operation for driving a focus lens in the imaging optical system.

14. The image stabilization apparatus according to claim 1,
wherein the operation for driving the movable lens is operation for driving a zoom lens in the imaging optical system.

15. The image stabilization apparatus according to claim 1,
wherein an angular velocity sensor is used as the shake detection device.

16. An image capturing apparatus comprising:
an image sensor configured to capture an image of a subject; and
an image stabilization apparatus including:
at least one processor or circuit configured to function as
a first acquisition unit configured to acquire an output of a shake detection device configured to detect a shake of the image capturing apparatus;
a motion vector detection unit configured to detect a motion vector from a plurality of images captured by the image capturing apparatus;
an estimation unit configured to calculate an estimate of an offset value of the shake detection device using an observed offset value of the shake detection device and an a priori offset estimate of the shake detection device that has been estimated so far, the observed offset value being obtained using a difference between the output of the shake detection device and the motion vector; and
a calculation unit configured to calculate a correction amount for correcting image blur using the output of the shake detection device and the estimate of the offset value;
wherein the estimation unit is configured to calculate the estimate of the offset value according to operation for driving a movable lens in an imaging optical system that is used for image capturing operation of the image capturing apparatus.

17. A method of controlling an image stabilization apparatus comprising:
acquiring an output of a shake detection device configured to detect a shake of an image capturing apparatus;
detecting a motion vector from a plurality of images captured by the image capturing apparatus;
calculating an estimate of an offset value of the shake detection device using an observed offset value of the shake detection device and an a priori offset estimate of the shake detection device that has been estimated so far, the observed offset value being obtained using a difference between the output of the shake detection device and the motion vector; and
calculating a correction amount for correcting image blur using the output of the shake detection device and the estimate of the offset value;
wherein, in the calculation of the estimate, the estimate of the offset value is calculated according to operation for driving a movable lens in an imaging optical system that is used for image capturing operation of the image capturing apparatus.

18. A non-transitory computer readable storage medium storing a program for causing a computer to function as each unit of an image stabilization apparatus, the image stabilization apparatus comprising:
a first acquisition unit configured to acquire an output of a shake detection device configured to detect a shake of an image capturing apparatus;
a motion vector detection unit configured to detect a motion vector from a plurality of images captured by the image capturing apparatus;
an estimation unit configured to calculate an estimate of an offset value of the shake detection device using an observed offset value of the shake detection device and an a priori offset estimate of the shake detection device that has been estimated so far, the observed offset value being obtained using a difference between the output of the shake detection device and the motion vector; and
a calculation unit configured to calculate a correction amount for correcting image blur using the output of the shake detection device and the estimate of the offset value;
wherein the estimation unit is configured to calculate the estimate of the offset value according to operation for driving a movable lens in an imaging optical system that is used for image capturing operation of the image capturing apparatus.

* * * * *